United States Patent [19]

Hyllberg

[11] Patent Number: 5,616,263

[45] Date of Patent: Apr. 1, 1997

[54] CERAMIC HEATER ROLLER

[75] Inventor: Bruce E. Hyllberg, Gurnee, Ill.

[73] Assignee: American Roller Company, Union Grove, Wis.

[21] Appl. No.: 541,569

[22] Filed: Oct. 10, 1995

Related U.S. Application Data

[60] Division of Ser. No. 3,156, Jan. 12, 1993, abandoned, and a continuation-in-part of Ser. No. 973,447, Nov. 9, 1992, abandoned.

[51] Int. Cl.$^6$ .................. H05B 1/02; F28F 5/02
[52] U.S. Cl. .................. 219/469; 492/46; 219/543; 29/620
[58] Field of Search .................. 219/469–471, 219/216, 388, 553, 543; 492/46, 53, 54; 427/446, 448, 453, 454; 501/127, 134, 126; 29/620, 611; 338/308; 355/285

[56] References Cited

U.S. PATENT DOCUMENTS

| | | | |
|---|---|---|---|
| 3,425,864 | 2/1969 | Morey | 29/620 |
| 3,607,343 | 9/1971 | Longo et al. | 427/453 |
| 4,009,658 | 3/1977 | Heurich | 427/423 |
| 4,487,841 | 12/1984 | Bartuska et al. | 501/121 |
| 4,544,828 | 10/1985 | Shigenobu et al. | 219/553 |
| 4,628,183 | 12/1986 | Satomura | 219/216 |
| 4,724,305 | 2/1988 | Iimura et al. | 219/469 |
| 4,743,940 | 5/1988 | Nagasaka et al. | 219/216 |
| 4,776,070 | 10/1988 | Shibata et al. | 492/46 |
| 4,791,275 | 12/1988 | Lee et al. | 219/469 |
| 4,808,490 | 2/1989 | Tsukuda et al. | 428/699 |
| 4,810,858 | 3/1989 | Urban et al. | 219/469 |
| 4,813,372 | 3/1989 | Koqure et al. | 219/216 |
| 4,820,904 | 4/1989 | Urban | 219/216 |
| 4,841,154 | 6/1989 | Yoshikawa et al. | 250/317.1 |
| 4,864,331 | 9/1989 | Boyer et al. | 346/159 |
| 4,888,464 | 12/1989 | Shibata et al. | 492/46 |
| 5,076,815 | 12/1991 | Kunz et al. | 501/127 |
| 5,089,856 | 2/1992 | Landa et al. | 355/279 |
| 5,110,774 | 5/1992 | Ogura | 428/329 |
| 5,191,381 | 3/1993 | Yuan | 219/469 |
| 5,206,484 | 4/1993 | Issartel | 219/220 |
| 5,233,153 | 8/1993 | Coats | 427/446 |
| 5,280,329 | 1/1994 | Akiyama et al. | 355/285 |
| 5,408,070 | 4/1995 | Hyllberg | 219/469 |
| 5,420,395 | 5/1995 | Hyllberg et al. | 219/470 |

FOREIGN PATENT DOCUMENTS

| | | | |
|---|---|---|---|
| 0527576 | 2/1993 | European Pat. Off. . | |
| 3107290 | 1/1982 | Germany . | |
| 55-335595 | 9/1980 | Japan | 219/553 |
| 56-109381 | 8/1981 | Japan | 219/216 |
| 58-21279 | 4/1983 | Japan . | |
| 59-149385 | 12/1984 | Japan . | |
| 1595061 | 8/1981 | United Kingdom | 427/453 |

OTHER PUBLICATIONS

Herman, Herbert "Plasma–sprayed Coatings", Scientific American, Sep., 1988, pp. 112–117.

*Primary Examiner*—John A. Jeffery
*Attorney, Agent, or Firm*—Quarles & Brady

[57] ABSTRACT

A thermal conductive roller for use in copying machines, steam-heated and induction-heated applications includes a ceramic heating layer formed by plasma spraying a ceramic material to form an electrically conductive heating layer of preselected and and controlled resistance. Several methods of controlling the resistance of the ceramic heating layer are disclosed. The ceramic heating layer is sealed with a solid, low viscosity sealer such as Carnauba wax to protect the ceramic layer from moisture penetration. Electrical current is applied at or near the core and is conducted radially outward through the heating layer to an outer grounded metallic layer. An outer contact layer of metal, ceramic, or polymeric material can be added.

10 Claims, 2 Drawing Sheets

CERAMIC HEATER ROLLER

CROSS-REFERENCE TO RELATED APPLICATION

This application is a division of Ser. No. 08/003,156, filed Jan. 12, 1993, and a continuation-in-part of Ser. No. 07/973,447, filed Nov. 9, 1992, both now abandoned.

BACKGROUND OF THE INVENTION

1. Field of the Invention

The invention relates to heater rollers for use in a variety of industrial machines, as well as methods of making such rollers.

2. Description of the Background Art

Steam-heated and induction-heated rollers are used in the paper making, printing, paper, film, and foil converting industries. Some examples are: web heating rollers, drying rollers and drums, laminating rollers, embossing rollers, and cast film extrusion rollers.

Steam-heated rollers are actually pressure vessels, especially at higher temperatures. The internal construction of both steam-heated and induction-heated cores can be quite complex and expensive in order to provide the temperature uniformity needed. In addition, a considerable amount of auxiliary equipment is needed to power or heat the roller.

Internally heated fuser rollers are used in the copier industry. The fuser roller melts the toner and presses it into the paper. The typical fuser roller consists of an aluminum or non-magnetic metal core with an internal quartz heating lamp. The inner diameter of the core has a special coating to absorb heat from the lamp. The roller is coated with a non-stick elastomeric material (e.g. silicone rubber) to provide a pressure nip with an opposing roller and to release the toner to the paper.

The core construction is quite complex and expensive. The quartz lamp is fragile, has a limited useful life, and does not provide a uniform temperature distribution to the core.

Heating rollers for xerography and other applications are disclosed in the following U.S. patents., Satomura, U.S. Pat. No. 4,628,183; Nagaska, et al., U.S. Pat. No. 4,743,940; Lee, et al., U.S. Pat. No. 4,791,275; Kogure, et al., U.S. Pat. No. 4,813,372; Urban, et al., U.S. Pat. No. 4,810,858; Urban, U.S. Pat. No. 4,820,904, Yoshikawa, et al., U.S. Pat. No. 4,841,154; Landa, et al., U.S. Pat. No. 5,089,856.

It is typical in such rollers to apply a voltage potential at one end of the heating layer and a ground potential at the the other end of the heating layer to produce a current in the heating layer.

For example, in Satomura, U.S. Pat. No. 4,628,183, one side of a voltage supply is applied to one set of conductive fingers in a ceramic heating layer, while the other side of the voltage supply is applied to another set of conductive fingers in the ceramic heating layer. The two sets of fingers are interdigitated and electrical current is produced in the heating layer between the two sets of fingers.

The ceramic material is a baked ceramic material in which the conductive electrodes are sandwiched between two ceramic layers.

The present invention is directed to improved constructions of heater rollers utilizing a ceramic heating layer and to improved methods of making such heater rollers.

SUMMARY OF THE INVENTION

The invention relates, in one aspect, to a thermal conduction roller having a cylindrical roller core with a ceramic heating layer of predetermined and controlled resistance disposed around and over the core. A conductive ground layer is posed around and over the ceramic heating layer, the conductive ground layer being connectable to an electrical ground. A voltage is applied to the core, or to a thin layer of metal on the outer surface of the core. Current flows outwardly from the core through the ceramic heating layer to the outer ground layer, which may be covered with an outer functional layer of elastomeric or other material for durable performance over the life of the roller.

Such a construction does not require internal complexity and the ceramic layer provides a controlled temperature profile across the roller surface. The core can also be thermally isolated, if desired, from the heated region to reduce power usage and wasted heat and to reduce lag in thermal regulation response due to the thermal mass of the core.

In a second aspect, the invention relates to the method of making a heater roller in which the ceramic heating layer is formed by plasma spraying, which is one type of thermal spraying. This significantly decreases the resistance of a semiconductive ceramic material. The ceramic material is applied in a manner to control electrical resistance of the ceramic heating layer.

The electrical resistance of the ceramic heating layer can be controlled by blending the first ceramic material with a metallic material or with a second semiconductive ceramic material and applying the ceramic heating layer in a thickness selected to control electrical resistance. The ceramic heating layer is formed of a plurality of thinner layers, which are applied one over the other to build up the ceramic heating layer.

The electrical resistance of the ceramic heating layer can also be controlled by varying the hydrogen secondary plasma gas level during plasma spraying.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
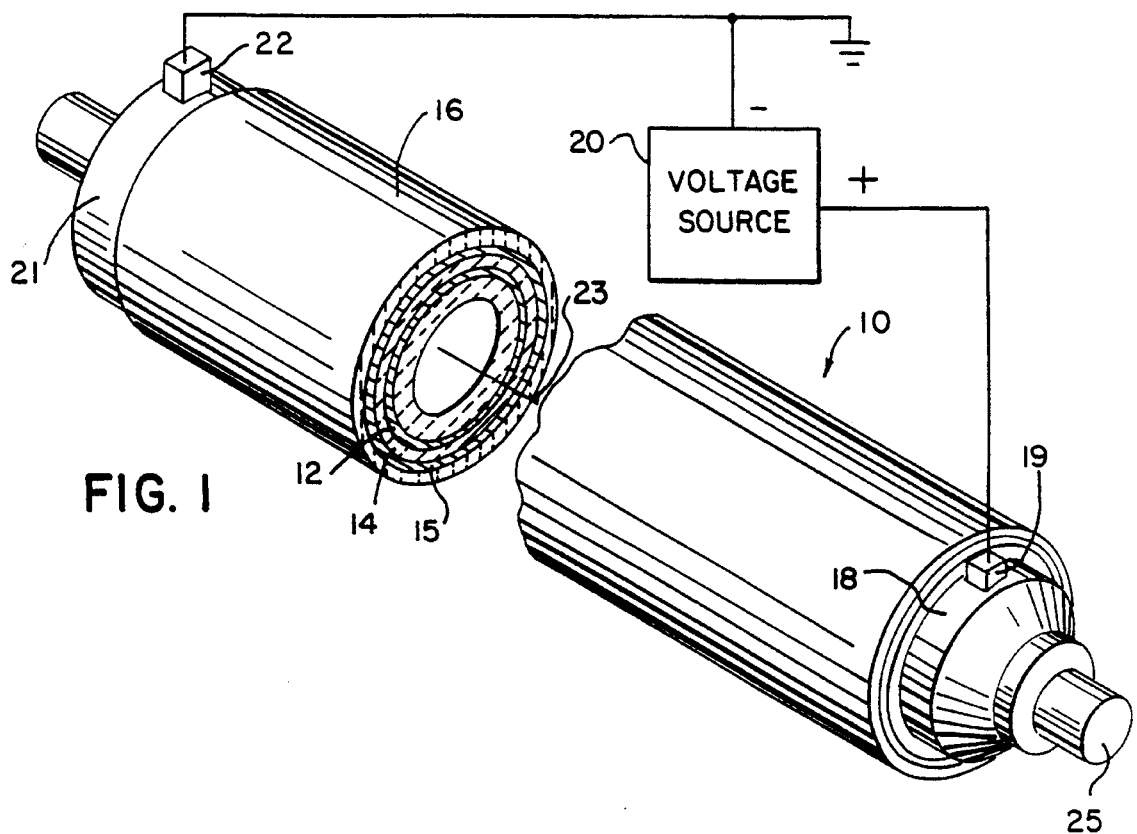
FIG. 1 is a perspective view of a roller of the present invention with parts broken away.

FIG. 1 shows a preferred embodiment of a heater roller 10 of a type for use in copying machines, or in other industrial applications, such as steam-heated or induction-heated rollers for the paper making, printing, paper, film, and foil converting industries.

The finished roller 10 includes a hollow cylindrical core 11 with suitable journal shafts 25 for disposition in suitable machine bearing structures of a type known in the art. The core material in the preferred embodiment is glass, but stainless steel, brass, some steels, aluminum, or an FRP composite type material can also be used. If a non-insulating core is used, the shafts 25 or their bearings must be insulated from the rest of the machine.

Figure 5:
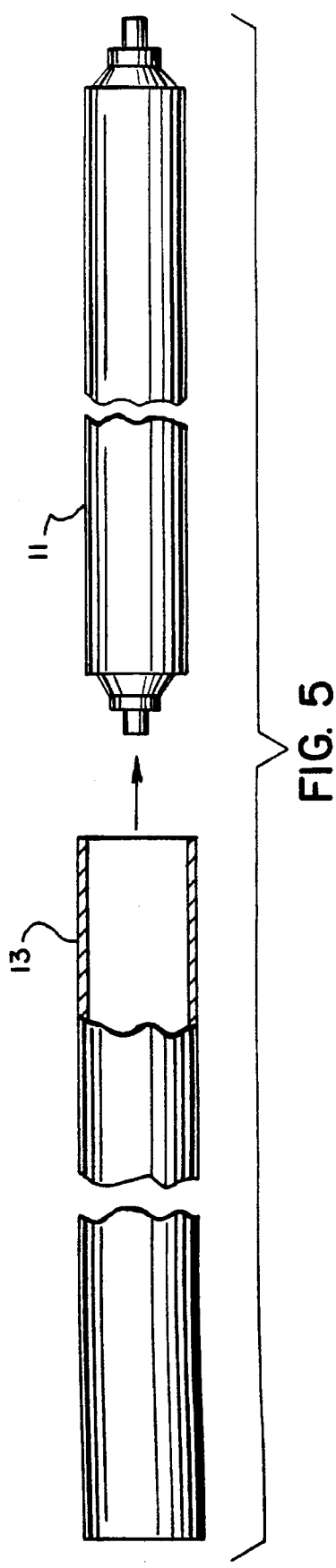
FIG. 5 is an exploded view of the roller of FIG. 1 showing use of a metallic sleeve to form the metallic layers of the roller.

If the core 11 includes a non-conducting material such as glass, a thin layer of metal 12 of 1 to 3 mils thickness (1 mil=0.001 inches) is formed over the full outer surface of the core 11. This metal layer 12 can be formed by plasma spraying a bond coating over the full outer surface of the core 11, or as shown in FIG. 5, this layer can be formed by an expandable metal sleeve 13, which is placed over the non-conducting material 11 as shown in FIG. 5. A bond coating may then be sprayed on the metal sleeve 13 to assist the formation of a bond to the next layer.

Next, a ceramic layer 14 from 1 to 100 mils in thickness is formed over the full outer surface of the bonding layer 12.

This is followed by a second thin layer of metal 15 of 1 to 3 mils thickness which is formed over the full outer surface of the layer 14. This layer 15 can be formed by an expandable metal sleeve similar to the sleeve 13, which is shown in FIG. 5.

The outer surface of the roller 10 is provided by a functional layer 16 of ceramic, alloy, tungsten carbide, or elastomeric/polymeric material. If the outer functional layer 16 is formed of a metal, such as stainless steel, nickel, or tungsten carbide/cobalt composite, this outer layer 16 is connected to a grounded negative (−) side of the power supply. If the outer functional layer 16 is formed of a ceramic, the ceramic is applied by plasma spraying.

Figure 4:
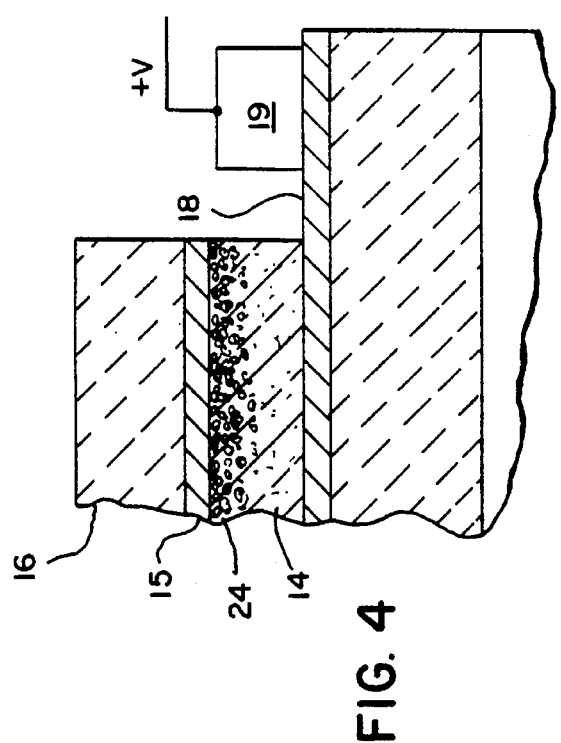
FIG. 4 is a right end fragment of a longitudinal section of the roller of FIG. 1.
Figure 3:
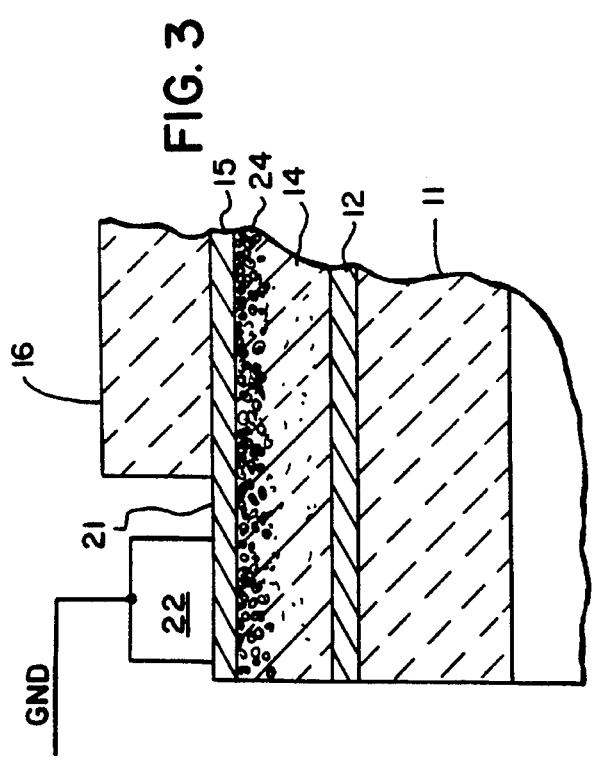
FIG. 3 is a left end fragment of a longitudinal section of the roller of FIG. 1.

The inner metal layer 12 forms a ring-shaped band 18 extending from one end of the roller 10 (FIG. 4). A brush, represented by element 19, contacts bond 18 and is electrically connected to the positive (+) voltage terminal of voltage source 20. The outer metal layer 15 forms a ring-shaped band 21 extending from an opposite end of the roller 10 (FIG. 3). A brush, represented by element 22, contacts bond 21 and is electrically connected to the grounded negative (−) terminal of the voltage source 20. This provides a ground layer 15 just underneath the outer functional layer 16. The voltage source 20 may supply either alternating current or direct current.

Figure 2:
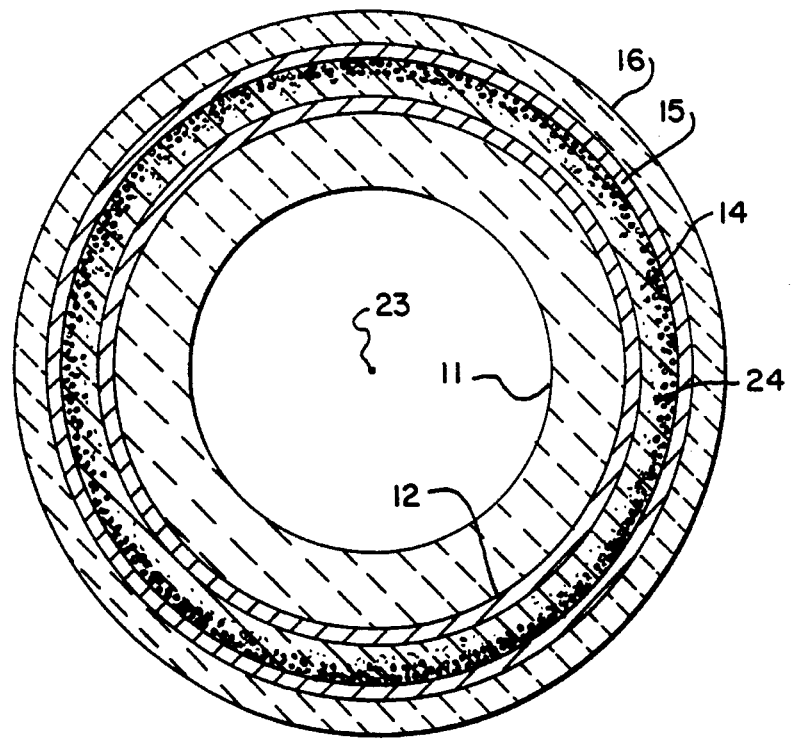
FIG. 2 is a cross sectional view of a portion of the roller of FIG. 1.

With this arrangement, current flows in a radial direction between layers 12 and 15 relative to a longitudinal axis 23 of the roller 10 seen in FIGS. 1 and 2.

Usually the surface of a metal core is roughened by grit blasting to clean the metal surface and to provide a surface roughness $R_a$ of about 200 to 300 microinches to improve the mechanical bonding of the ceramic layer 14 to the core. Where a core of non-metallic material 11 is used, a metallic bonding layer 12 of nickel-aluminide such as Metco 450 or 480, or nickel-chrome, such as Metco 43C, is applied in a layer 3 mils to 5 mils thick or more. The bonding layer 12 provides the surface roughness $R_a$ of 300 microinches or greater.

Where a metallic core is used, the heater layer 14 is electrically and (optionally) thermally insulated from the metallic core by an insulating layer (not shown) of plasma sprayed ceramic such as alumina, Metco 101 or 105, or preferably zirconia, Metco 201 or 204. Zirconia can be used as an electrically insulating barrier coating a few mils thick. In thicker layers, zirconia is an effective thermal barrier coating due to its low thermal conductivity. It can be plasma sprayed in layers of 250 mils thick (¼ inch) or greater.

The insulating layer does not need to be any thicker than what is required to resist the voltage applied to the heater layer. The dielectric strength of plasma-sprayed alumina for example can be up to 300 volts per mil of coating thickness.

The preferred material for the ceramic heating layer 14 is titanium dioxide, such as Metco 102 ceramic powder. This is commercially available from Metco Corp., Westbury, N.Y., USA. Titanium dioxide ($TiO_2$) is normally an electrical insulating material. However, when the material is plasma-sprayed, some of the dioxide form is chemically reduced to a conductive sub-oxide (mono-oxide) form, rendering the deposited coating electrically semiconductive.

As used herein, the term "insulating" material shall mean a material with a volume resistivity of $10^{10}$ ohm-centimeters or greater. As used herein, the term "semiconductive" material shall mean a material with a volume resistivity between $10^3$ ohm-centimeters and $10^{10}$ ohm-centimeters. Titanium dioxide ($T_iO_2$) and chromium oxide ($Cr_2O_4$) are examples of semiconductive or lower resistance ceramics. These ceramics have volume resistivities typically of $10^8$ ohm-centimeters or lower.

Titanium dioxide can be used as the only component of the heater layer or it can be blended with other ceramics to increase or decrease the volume resistivity of the final coating. For example, insulating ceramics such as zirconia or alumina can be blended with semiconductive ceramics such as chromium oxide.

Plasma spraying, which is one type of thermal spraying, is advantageous in adjusting the thickness of the coating to a suitable range independent of the electrical resistance of the titanium dioxide portion of the heater layer.

For any ceramic layer containing titania (titanium dioxide), the resistance of the layer is also affected by the spraying conditions. Titania can be partially reduced to a suboxide by the presence of hydrogen or other reducing agents in the plasma flame. It is the suboxide (probably $T_iO$ rather than $T_iO_2$) that is the semiconductor in the ceramic layer 14. Titanium dioxide is normally a dielectric material. The typical average chemical composition of titanium dioxide is 1.8 oxygen per molecule rather than 2.0 in a plasma sprayed coating. This level (and thus the coating properties) can be adjusted to some extent by raising or lowering the percent of hydrogen in the plasma flame. The normal primary gas is nitrogen or argon while the secondary gas is hydrogen or helium. The secondary gas raises the ionization potential of the mixture, thus increasing the power level at a given electrode current. For a typical Metco plasma gun, the hydrogen level is adjusted to maintain the electrode voltage in the gun between 74 and 80 volts.

Regardless of the mixture of powders used, the plasma spray parameters should be suitably adjusted to insure that the blend of materials in the finished ceramic layer 14 is the same as intended. All of the powders mentioned do not require the same power levels, spray distance, and other parameters. Thus, adjustment of spray distance, for example, may increase the deposit efficiency of one powder over the other and change the material blend in the finished coating.

Plasma sprayed ceramic coatings can be applied in one pass (layer) of the plasma gun or in multiple passes. The normal method for most types of coating applications is to apply multiple thin coatings of ceramic and build up to the required thickness. Although the ceramic layer described above has a uniform ceramic composition, the sublayers of ceramic in the resulting layer 14 do not have to have the same composition.

The hydrogen level can be varied during the application of each spray pass to apply a titanium dioxide layer that has a non-uniform electrical resistance from end to end of the roller. This would normally be done to apply more heat to the ends of the roller, where the heat losses are greater, to achieve a uniform temperature across the roller face in its functional environment.

The thickness of the heater layer 14 can be adjusted to provide the appropriate resistance for the application. The heater layer 14 may vary in total thickness from about 1 mil to about 100 mils depending on the roller diameter and length, operating temperature, wattage throughput and power supply voltage. In the preferred embodiment, the heater layer 14 is in a range from 5 mils to 10 mils thick.

Plasma-sprayed ceramic can be applied in very thin layers (at least as low as 0.1 mil per spray pass). For many heating applications, the heater layer formed by plasma-spraying thin layers will provide a minimal temperature variation due to thickness variation of the resulting layer.

The temperature uniformity depends primarily on the thickness uniformity of the heater layer. Since the heater layer is composed of many, thin layers or spray passes, material variation is generally not an issue.

Precise control of the heater layer thickness can be achieved by conventional grinding of the ceramic layer.

A second bonding layer 15 of nickel aluminide, such as Metco 450 or 480, or nickel chrome, such as Metco 43C, is applied by thermal spraying to a thickness of at least 3 mils to 5 mils.

The outer functional layer 16 is then applied. This may be any material that can be applied by thermal spraying, any elastomer, thermoplastic or thermoset resin, suitable for the roller application.

The outer metal layer can be applied by electroplating, if the ceramic is sealed, with the outer functional layer, preferably silicone rubber, bonded to the electroplate. The electroplate must not contact the core.

The outer layer 16 can be plasma sprayed metal, if the ceramic is not sealed or ground, with the outer functional layer plasma sprayed and bonded to the sprayed metal layer 15. Such outer metallic layer 16 would preferably be a nickel alloy, stainless steel, or low resistance cermet.

If the ceramic is ground, it can be sealed. This increases the dielectric strength of the heater layer 14 and prevents moisture and humidity from changing the effective ceramic resistance and causing short circuits.

While the roller is still hot from the plasma or thermal spraying of the ceramic layer 14, a seal coat 24 is applied to the ceramic layer 14 using a dielectric organic material such as Carnauba wax or Loctite 290 weld sealant. The sealant 24 is cured, if necessary, (Loctite 290), with heat, ultra violet light, or spray-on accelerators. The ceramic porosity level is generally less than 5% by weight (usually on the order of 2%). Once sealed, the porosity level has a minimal effect on the coating properties for this application.

The preferred types of materials are 100 percent solids and low viscosity. These include various kinds of waxes, condensation cure silicone elastomers, and epoxies, methacrylates, thermoset resins and polymerizing weld sealants, such as Loctite 290.

The sealer will generally be a high resistance material, although the electrical properties of the sealer affect the overall properties of the sealed ceramic layers 14, 24. For example, sealing with Carnauba wax will result in a higher resistance of the sealed ceramic layer 14, 24 than Loctite 290 weld sealant because it is a better dielectric material.

A finishing step is to grind and polish the sealed ceramic layer 14, 24 to the proper dimensions and surface finish (diamond, silicon carbide abrasives, etc.).

The outer metallic layer 15 can be a metallic sleeve of nickel, steel, or aluminum, that is removeable and replaceable. The outer functional layer 16 is then bonded to the replaceable sleeve. The ceramic heater layer 14 would be ground and sealed in this case. If the outer functional layer 16 is damaged or wears out, the roller can be returned to service simply by installing a new sleeve.

The surface of the core 11 can be crowned positive or negative, to provide a variable ceramic heater layer thickness to compensate for non-uniform heat losses. This could be used to provide a certain temperature profile across the face of the roller 10 in its application.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. A three-layer thermal conduction roller for use in industrial applications in which a voltage is applied to the roller to cause heating within a heating layer, the roller comprising:

a cylindrical roller core;

a first layer of an insulating material disposed around the cylindrical roller core;

a second layer of a semiconductive heating ceramic disposed around the insulating layer and the cylindrical roller core; and an outermost layer, which forms the outer surface of the roller, the outermost layer being disposed around and over the layer of semiconductive heating ceramic for conducting and carrying heat to a work object, the outermost layer being electrically insulative;

wherein the second layer is formed of at least one plasma-sprayed coating of ceramic material; and wherein the electrical resistance of the layer of semiconductive heating ceramic varies longitudinally along the roller according to the manner in which the semiconductive heating ceramic is plasma sprayed longitudinally along the roller.

2. The roller of claim 1, wherein the roller core is formed completely of conductive material.

3. The roller of claim 1, wherein
   the ceramic heating layer is a plasma-sprayed blend of the ceramic material and a second ceramic material.

4. The roller of claim 3, wherein
   wherein the ceramic material is titanium dioxide or chromium oxide; and
   the second ceramic material is alumina or zirconia.

5. The roller of claim 1, wherein
   the ceramic heating layer includes plasma-sprayed titanium dioxide; and
   wherein the electrical resistance of the ceramic heating layer is controlled by varying the hydrogen secondary plasma gas level during plasma spraying.

6. A method of making a thermal conduction roller for use in industrial applications in which a voltage is applied to cause heating within a heating layer disposed between an inner insulating layer and an outer contact surface, the method comprising:

plasma spraying a ceramic material in one or more sublayers to form an electrically conductive ceramic heating layer of controlled resistance between the insulating layer and the outer contact surface; and applying an outer functional layer of ceramic or an elastomeric material around and over the ceramic heating layer;

wherein the ceramic heating layer is made by plasma spraying titanium dioxide; and wherein the electrical resistance of the ceramic heating layer is varied longitudinally along the roller as the titanium dioxide is plasma sprayed longitudinally along the roller.

7. The method of claim 6, wherein the electrical resistance of the ceramic heating layer is controlled by varying the hydrogen secondary plasma gas level.

8. The method of claim 6, further comprising the step of sealing the ceramic heating layer with a seal coat.

9. The roller of claim 8, wherein the seal coat is a 100% solid material.

10. The roller of claim 8, wherein the seal coat is a Carnauba wax.

* * * * *